United States Patent Office 3,847,874
Patented Nov. 12, 1974

3,847,874
POLYURETHANE COMPOSITION BASED ON EPOXIDE-MODIFIED LINEAR POLYESTER
Yoichi Murakami and Hikaru Watanabe, Amagasaki, Japan, assignors to Dainippon Ink and Chemicals, Inc., Tokyo, Japan
No Drawing. Filed Nov. 14, 1972, Ser. No. 306,284
Claims priority, application Japan, Jan. 22, 1970, 45/5,436
Int. Cl. C08g 22/10
U.S. Cl. 260—77.5 AN         4 Claims

ABSTRACT OF THE DISCLOSURE

A resin composition suitable for use as paints is prepared by reactings a polyfunctional high-molecular-weight linear polyester having a number average molecular weight of at least about 6,000 with a polyisocyanate such as aliphatic or aromatic diisocyanate. The polyfunctional polyester is obtained by reacting a linear polyester, which is derived from difunctional carboxylic acids and diols, having a number average molecular weight of about 1,000 to about 8,000 and a ratio of the terminal carboxyl group to the terminal hydroxyl group of at least 1 with a diepoxide at the epoxy group to the terminal carboxyl group ratio of from 0.5 to 2. The composition can give a baked film having excellent hardness, adhesion, chemical resistance, soiling resistance, and impact resistance.

---

This application is a continuation-in-part of Ser. No. 107,857, filed Jan. 19, 1971 and now U.S. Pat. 3,719,725.

This invention relates to a resin composition suitable for use as a paint which comprises a polyfunctional high-molecular-weight linear polyester and a polyisocyanate.

The linear polyester which is the starting material of the polyfunctional polyester is prepared from an optional dicarboxylic acid and an optional saturated dihydric alcohol, and is a linear polyester having a number average molecular weight of from about 1,000 to about 8,000 in which the ratio of the terminal carboxyl group to the terminal hydroxyl group is at least 1. The linear polyester may be those in which both ends are carboxyl groups. The reaction for producing the polyfunctional polyester can be performed either by the melting or by the solvent method. The reaction can also be carried out in the presence of any known esterification catalyst.

The dicarboxylic acid that can be used as a material to produce the linear polyester includes, for instance, saturated aliphatic or aromatic dicarboxylic acids such as oxalic acid, malonic acid, succinic acid, glutaric acid, adipic acid, pimelic acid, suberic acid, azelaic acid, sebacic acid, brassylic acid, α-butyl-α-ethylglutaric acid, α,β-diethyl-succinic acid, phthalic anhydride, isophthalic acid, or terephthalic acid. Such dicarboxylic acids are described, for instance, in the specification of U.S. Pat. 3,236,812. These acids may be used conjointly with $C_{1-4}$ alkyl esters of these acids.

Examples of the saturated dihydric alcohol that can be used as the other material to produce the linear polyester preferably include low-molecular-weight saturated aliphatic dihydric alcohols such as ethylene glycol, diethylene glycol, 1,3-propylene glycol, 1,2-propylene glycol, 1,4-butylene glycol, 1,3-butylene glycol, 1,5-pentanediol, 1,4-pentanediol, 1,3-pentanediol, 1,6-hexanediol, 1,7-heptanediol, 2,2-dimethyl-1,3-propanediol, 1,8-octanediol or 1,20-eicosanediol. These dihydric alcohols are described, for instance, in the specification of U.S. Pat. 3,236,812. Low-molecular-weight alicyclic dihydric alcohols such as 1,4-cyclohexane dimethanol or hydrogenated bisphenol A may also be used as the saturated dihydric alcohol.

When the solvent method is used to prepare the linear polyester, an organic solvent, for example, aromatic hydrocarbons such as xylol, toluol and benzene or ketones such as methyl ethyl ketone, methyl isobutyl ketone, cyclohexanone, or isophorone may be used. It is also possible to use mixed solvents consisting of these with esters such as ethyl acetate, butyl acetate and Cellosolve acetate. These solvents can also be used in the manufacture of the polyfunctional polyester.

The polyfunctional polyester referred to in the present invention is a linear high-molecular-weight polymer having a number average molecular weight of about 6,000 or more, and is obtained by ring-opening esterification reaction of a linear polyester with a diepoxide with the ratio of the epoxy group to the terminal carboxyl group being maintained within the range of 0.5 to 2.

As the polyfunctional polyester, those having a considerably high molecular weight can be used, but the preferred polyfunctional polyesters are those having a number average molecular weight of at least about 6,000. There is no strict limitation in this regard. Commercially feasible polyfunctional polyesters have a number average molecular weight of up to about 100,000.

When the linear polyester is reacted with the diepoxide in an amount such that the ratio of the epoxy group to the terminal carboxyl group is outside the range of 0.5 to 2, only a polyfunctional polyester having low molecular weight is obtained. A cured film obtained by using such polyfunctional polyester having low molecular weight is inferior in film properties, and is not feasible.

The ring-opening esterification reaction is carried out by heating the linear polyester and the diepoxide directly or after dissolving them in an organic solvent, at a temperature of not more than 200° C., preferably below 150° C. When the reaction temperature is over 200° C., the hydroxyl group in the molecule of the resulting polyfunctional polyester undergoes an esterification reaction with the terminal carboxyl group of the unreacted linear polyester, which tends to cause the gellation of the reaction system. On the other hand, when a linear polyester having a molecular weight of less than 1,000 is used, the amount of the diepoxide necessary for increasing the molecular weight of the polyester becomes large, and consequently, the resulting polyfunctional polyester has too much functional groups. A composition obtained by blending an amino resin or polyisocyanate with such polyfunctional polyester is not desirable in respect of the efficiency of painting work and solubility. Linear polyesters having a molecular weight of over 8,000 are unsuitable for use in the present invention since the resulting high-molecular-weight polyesters have too little functional groups.

The diepoxide necessary for obtaining the polyfunctional polyester is any compound which has in its molecule two epoxy groups reactive with the carboxyl groups. Examples of the diepoxide include condensation products between bisphenol-A and epichlorohydrin such as Epikote 828, Epikote 1001, Epikote 1004, Epikote 1007 and Epikote 1009 (products of Shell Petroleum Co.); ester-type diepoxides such as diglycidyl phthalate, diglycidyl terephthalate, diglycidyl adipate, diglycidyl glutarate, diglycidyl succinate, diglycidyl oxalate, and diglycidyl azepate; alicyclic diepoxides such as limonene dioxide, dicyclopentadiene dioxide, vinyl cyclohexane dioxide, or 3,4-epoxy-6-methylcyclohexylmethyl-3,4-epoxy-6-methylcyclohexane carboxylate; and aliphatic ether type diepoxides, such as ethylene glycol diglycidyl ether, diethylene diglycol diglycidyl ether, triethylene glycol diglycidyl ether, 1,2-propylene glycol diglycidyl ether, 1,4-butylene glycol diglycidyl ether, 1,5-pentanediol diglycidyl ether, or glycerine diglycidyl ether. These diepoxides are described, for instance, in U.S. Pat. 3,245,925 and U.S. Pat. 3,378,601.

The resin composition of the present invention is obtained by reacting a polyisocyanate with this polyfunctional polyester. The preferred weight ratio of the polyfunctional polyester to the polyisocyanate is 95:5 to 75:25. If the ratio is outside the range of 99:1 to 60:40, a film obtained by heating and curing the composition does not have sufficient hardness, and is poor in adhesion, resistance to solvent, etc., since the amount of the polyfunctional polyester becomes extremely large or the amount of the polyisocyanate becomes too large. In other words, when the amount of the polyfunctional polyester is extremely large, the cross-linking and curing of the composition is not sufficient, and when the amount of the polyisocyanate is large, the number of the functional groups is excessive and results in a poor film.

The examples of the polyisocyanate that can be used in the present invention are described in the specification of U.S. Pat. 3,401,135, and include aromatic and aliphatic diisocyanates such as 2,4-tolylenediisocyanate, 2,6-tolylenediisocyanate, meta-xylene diisocyanate, para-xylene diisocyanate, diphenylmethane-4,4'-diisocyanate, 3,3'-dimethyl-4,4'-diphenylene diisocyanate, hexamethylene-1,6-diisocyanate, triphenylmethane triisocyanate, or butylene-1,2-diisocyanate; and the addition products between these diisocyanates and polyhydric alcohols of low molecular weight such as ethylene glycol, propylene glycol, trimethylol propane, glycerine, hexanetriol, sorbitol, manitol or sorbitan. There can also be used blocked polyisocyanates obtained by treating the aforementioned isocyanates with a blocking agent such as phenols, tertiary alcohols, active methylene compounds, oximes, imines and lactams. Alicyclic diisocyanates such as isophorone diisocyanates, and polymers of the aforementioned diisocyanates can also be used.

The resin composition of the present invention can be diluted with a solvent prior to using it in various applications. Examples of the solvents that can be used for this purpose are, for example, chlorinated hydrocarbons such as chloroform, trichloroethylene, or dichlorobenzene, ethers such as dioxane and tetrahydrofuran, and dimethyl formamide, in addition to the solvents mentioned above which can be used in the synthesis of the linear polyester. Mixtures of these solvents in optional combinations are suitably used in the present invention.

When the resin composition of the invention is used for instance as a paint, it is possible to incorporate a pigment in it. The pigments that can be used may be organic or inorganic, and include inorganic pigments such as clay, talc, zinc oxide, lithopone, red iron oxide, red lead, chrome yellow, chrome green, Prussian blue, or carbon black, and organic pigments of the azo, phthalocyanine, quinacridone, anthraquinone, dioxazine, thioindigo, and perylene series.

When heated and cured, the resin composition of the invention forms a film which has excellent properties required of the film, such as solvent resistance, hardness, flexibility, resistance to soiling, adhesion, corrosion resistance, and chemical resistance. The resin compositions of the invention comprising the polyfunctional polyesters and polyisocyanates (other than the block polyisocyanates) can be cured at room temperature to form a film having excellent properties.

The resin composition of the invention may be in the form of a solution in a solvent, or in the form of powders. Such powdery resin composition can be prepared by blending a polyfunctional polyester substantially free of solvent with the block polyisocyanate. The polyfunctional polyester substantially free of solvent can be prepared, for example, by heating a linear polyester and a diepoxide in the absence of a solvent, or concentrating a solution containing a polyfunctional polyester under reduced pressure followed by drying by a flush dryer, or by adding such solution dropwise to a non-solvent to coagulate it, followed by drying.

The resin composition of this invention can be used advantageously as paints, films, etc., especially paints.

The invention will further be described in detail by the following Examples which are presented for illustrative, rather than limitative, purposes. Unless otherwise specified, all parts and percentages are by weight.

EXAMPLE 1

Neopentyl glycol (17.2 parts), 10.2 parts of ethylene glycol, 29.1 parts of dimethyl terephthalate and 0.009 part of zinc acetate were put into a flask equipped with a reflux condenser. With stirring in a stream of an inert gas, the materials were heated at 210° C. for about 2 hours. Methanol of the theoretical amount distilled out. To the reaction mixture was added 24.9 parts of isophthalic acid, and the mixture was maintained for 3 hours at 210° C. For promoting dehydration, 3 parts of xylol was added dropwise under reflux. The reaction was further continued for 5 hours while raising the reaction temperature gradually to 230° C. to form a high-molecular-weight polyester having an acid value of 24 and a hydroxyl value of 5.6. Its number average molecular weight calculated was about 3,800. The resulting polyester was dissolved in a mixed solvent of xylol/methyl isobutyl ketone/cyclohexanone (50/25/25) so that its solids content reached 50%, to give a resin solution having a Gardner viscosity of P.

To 50 parts of the resin solution were added 1.1 parts of glycerine diglycidyl ether, 10 parts of xylol, 5 parts of cyclohexanone and 0.027 part of 2-methylimidazole, and the mixture was heated for 7 hours at 115° C. There was obtained a solution of polyfunctional polyester having a non-volatile component content of 40.5%, an acid value of 1.9, and a Gardner viscosity of $Z_2$. It had a number average molecular weight of about 7,500.

500 parts of the polyfunctional polyester was mixed with 200 parts of rutile titanium oxide by means of three rolls, and then the mixture was diluted with a mixed solvent of xylol/methyl isobutyl ketone/cyclohexanone (50/25/25) to prepare a white enamel base having a solids content of 56%. Next, to 200 parts of this white enamel base, 10 parts of the addition product of 3 mols of hexamethylene diisocyanate and 1 mol of trimethylol propane was added in the form of an ethyl acetate solution having a non-volatile component content of 75±1% to prepare a white enamel. The resulting white enamel was coated on a 0.3 mm. thick zinc iron plate by a bar coater to a baked film thickness of 15 to 18μ, and baked at 250° C. for 1 minute.

The baked film prepared had a high hardness and other excellet properties as shown in Table 1.

EXAMPLE 2

A mixture consisting of 21.3 parts of neopentyl glycol, 12.7 parts of ethylene glycol, 52 parts of sebacic acid and 0.05 part of dibutyltin oxide was heated at 210° C. for 5 hours in an inert gas stream, 4 parts of xylol was added thereto, and then 5 hours were taken to raise the reaction temperature to 230° C. Thus, a high molecular weight polyester having an acid value of 22, a hydroxyl value of 1.8 and a number average molecular weight of 2,300 was obtained. By dissolving this polyester in a mixed solvent of xylol/methyl isobutyl ketone/butyl acetate (50/25/25) so that the solids content may become 50%, a resin solution having a Gardner viscosity of K–L was obtained.

To 50 parts of this polyester, 3.4 parts of Epikote 828 (bisphenol type diepoxide made by Shell Chemicals), 20 parts of xylol, 7.6 parts of methyl isobutyl ketone and 0.048 part of 2-methyl-imidazole were added, and by heating the mixture at 115° C. for 10 hours, a polyfunctional polyester having a solids content of 40%, an acid value of 1.5 and a Gardner viscosity of $Z_1$ was produced.

A white enamel base was prepared from this polyester in the same manner as in Example 1. To 200 parts of this white enamel base, 8 parts of a trimethylol propane/1,3-butene diol/tolylenediisocyanates (2/3/10.75 in molar ratio) addition product was added to prepare a white enamel.

This white enamel was coated on a zinc iron plate in the same manner as in Example 1, and was baked at 100° C. for 5 minutes. The film thus prepared showed very excellent properties as shown in Table 1.

EXAMPLE 3

To 200 parts of the white enamel base prepared in Example 3, 8 parts of an addition product of 1 mol of trimethylol propane and 3 mols of xylene diisocyanate was added in the form of an ethyl acetate solution having a non-volatile component content of 75±1%, to prepare a white enamel.

The baked film prepared from this white enamel in the same manner as in Example 2 had very excellent properties as shown in Table 1.

EXAMPLE 4

13.2 parts of a blocked polyisocyanate obtained by reacting 85 parts of the polyisocyanate of Example 1 with 27 parts of methyl ethyl ketoxime was incorporated into 200 parts of the white enamel base prepared in Example 1.

This resultant white enamel could be stored stably at room temperature for several months, without causing any gelation.

This white enamel was coated on a zinc iron plate in the same manner as in Example 1, and was baked at 250° C. for 1.5 minutes. The film thus prepared had properties of approximately the same degree as those of the film of Example 1, as shown in Table 1.

EXAMPLE 5

The white enamel of Example 3 was coated on a zinc iron plate, and the coated film was dried for 3 days at room temperature, without baking it. The film thus prepared had properties roughly equal to those of the film of Example 3, as shown in Table 1.

COMPARATIVE EXAMPLE

Neopentyl glycol (26.1 parts) 25.4 parts of ethylene glycol, 29.1 parts of dimethyl terephthalate and 29.1 parts of dimethyl isophthalate were put into a flask, followed by addition of 0.018 part of zinc acetate. The mixture was heated for about 2 hours at 210° C. with stirring in a stream of an inert gas. Methanol of the theoretical amount distilled out, and the ester-interchange reaction was completed. The temperature was raised to 245° C., and the pressure reduced to 0.3 mm. Hg gradually. The reaction mixture was maintained for 1 hour at 245° C., and then excess glycol was removed out of the reaction system by distillation. The temperature was raised to 275° C., and the reaction mixture was maintained at this temperature for 2 hours, under the pressure of 0.3 mm. Hg. The polyester formed was a substantially hydroxyl-terminated resin having a number average molecular weight of greater than 10,000.

The resulting resin was dissolved in methyl ethyl ketone so that its solids content reached 30%. The solution of the resin was blended with the addition product of diisocyanate and trimethylol propane used in Example 1 at a ratio such that the hydroxyl/isocyanate ratio was 1:1; and was baked for 1 minute at 250° C. in the same manner as set forth in Example 1. The film obtained was inferior in the film properties to the film obtained in Example 1.

TABLE 1

| Properties | Example number | | | | | Comparative example |
|---|---|---|---|---|---|---|
| | 1 | 2 | 3 | 4 | 5 | |
| Pencil hardness | 4H | 4H | 4H | 4H | 2H | 3H |
| Impact strength | ++ | ++ | ++ | ++ | ++ | + |
| Bending impact test | ++ | + | + | ++ | ++ | + |
| Adhesion (cross cut; adhesive tape peeling) | ++ | ++ | ++ | ++ | ++ | + |
| Resistance to soiling (rouge) | + | + | ++ | ++ | ± | -- |
| Resistance to sulfuric acid (10%, 24 hours) | ++ | + | ++ | + | ± | + | + |
| Resistance to sodium hydroxide (10%, 24 hours) | + | + | + | + | ± | ± |
| Resistance to xylol (rubbing test) | + | ++ | ++ | ++ | + | - |
| Resistance to salt spray (100 hours) | ++ | ++ | + | + | ± | ± |

Note.—In the above table, the symbols represent the following:
++=Excellent. +=Good. ±=Fair. -=Poor. --=Very poor.

What is claimed is:

1. A resin composition consisting essentially of the reaction product of
   A. a polyisocyanate, present in from 1 to 40 parts by weight, with
   B. a polyfunctional linear polyester having an average molecular weight of at least about 6,000, and present in from 99 to 60 parts by weight, said polyester consisting essentially of the ring-opening esterification reaction product at not over 200° C. of
      (1) a linear polyester consisting essentially of the reaction product of
         (a) a saturated aliphatic or aromatic dicarboxylic acid or the $C_{1-4}$ alkyl esters thereof, with
         (b) a saturated aliphatic or alicyclic dihydric alcohol,
      said linear polyester having an average molecular weight of from about 1,000 to about 8,000 and a ratio of terminal carboxyl groups to terminal hydroxyl groups of at least 1, with
      (2) a diepoxide, the ratio of epoxy groups to terminal carboxyl groups being from 0.5 to 2.

2. The composition of Claim 1 in which the polyfunctional linear polyester has an average molecular weight of up to about 100,000.

3. The composition of Claim 1 in which the polyisocyanate is present in from about 5 to about 25 parts by weight and the polyfunctional linear polyester is present in from about 95 to about 75 parts by weight.

4. The composition of Claim 1 with the addition of at least one organic solvent.

References Cited

UNITED STATES PATENTS

| | | | |
|---|---|---|---|
| 3,478,126 | 11/1969 | Turpin | 260—835 |
| 3,502,620 | 3/1970 | Caldwell | 260—835 |
| 3,655,817 | 4/1972 | Lohse et al. | 260—835 |
| 3,723,568 | 3/1973 | Hoeschele | 260—835 |
| 3,758,427 | 9/1973 | Katsibas | 260—835 |

H. S. COCKERAM, Primary Examiner

U.S. Cl. X.R.

260—75 EP, 77.5 R